(12) United States Patent
Ruponen et al.

(10) Patent No.: US 12,507,918 B2
(45) Date of Patent: Dec. 30, 2025

(54) PHOTODETECTOR APPARATUS

(71) Applicant: Nokia Technologies Oy, Espoo (FI)

(72) Inventors: Pellervo Ruponen, Helsinki (FI); Kim Blomqvist, Espoo (FI)

(73) Assignee: Nokia Technologies Oy, Espoo (FI)

( * ) Notice: Subject to any disclaimer, the term of this patent is extended or adjusted under 35 U.S.C. 154(b) by 807 days.

(21) Appl. No.: 17/269,305

(22) PCT Filed: Jul. 30, 2019

(86) PCT No.: PCT/EP2019/070411
§ 371 (c)(1),
(2) Date: Feb. 18, 2021

(87) PCT Pub. No.: WO2020/038690
PCT Pub. Date: Feb. 27, 2020

(65) Prior Publication Data
US 2021/0177322 A1 Jun. 17, 2021

(30) Foreign Application Priority Data
Aug. 23, 2018 (EP) ...................................... 18190413

(51) Int. Cl.
*A61B 5/1455* (2006.01)
*A61B 5/00* (2006.01)

(52) U.S. Cl.
CPC .......... *A61B 5/14552* (2013.01); *A61B 5/681* (2013.01)

(58) Field of Classification Search
CPC .............................. A61B 5/14552; A61B 5/681
See application file for complete search history.

(56) References Cited

U.S. PATENT DOCUMENTS

| | | | |
|---|---|---|---|
| 4,655,225 A | 4/1987 | Dahne et al. | 128/633 |
| 4,690,565 A | 9/1987 | Kato et al. | 356/446 |
| 5,919,133 A * | 7/1999 | Taylor | A61B 46/10 600/323 |
| 6,198,952 B1 | 3/2001 | Miesel | 600/339 |
| 2002/0161290 A1* | 10/2002 | Chance | A61B 5/1459 600/323 |
| 2012/0123278 A1* | 5/2012 | Diab | A61B 5/6829 600/476 |
| 2014/0296671 A1 | 10/2014 | Yamashita et al. | 600/324 |

(Continued)

FOREIGN PATENT DOCUMENTS

| | | |
|---|---|---|
| EP | 3 061 387 A1 | 8/2016 |
| JP | 2013000157 A * | 1/2013 |
| WO | WO 2016/200274 A1 | 12/2016 |

OTHER PUBLICATIONS

Alzahrani, Abdullah, et al., "Amulti-channel opto-electronic sensor to accurately monitor heart rate against motion arefact during exercise", Nov. 2015, Article in Sensors, abstract, 2 pgs.

*Primary Examiner* — Abid A Mustansir
(74) *Attorney, Agent, or Firm* — McCarter & English, LLP

(57) ABSTRACT

An apparatus, such as a photoplethysmographic sensor, including a light source configured to illuminate a target, wherein the apparatus is configured to receive incident light reflected from or transmitted through the target. The apparatus includes also a reflective element configured to direct at least part of the received incident light to a focus point, and a photodetector configured to receive light from the focus point.

16 Claims, 3 Drawing Sheets

(56) References Cited

U.S. PATENT DOCUMENTS

2018/0103857 A1* 4/2018 Hirmer .............. A61B 5/02427
2018/0333053 A1* 11/2018 Verkruijsse .......... A61B 5/0295
2021/0177320 A1* 6/2021 Yoo ........................ H10K 30/88

* cited by examiner

PHOTODETECTOR APPARATUS

CROSS REFERENCE TO RELATED APPLICATION

This patent application is a U.S. National Stage application of International Patent Application Number PCT/EP2019/070411 filed Jul. 30, 2019, which is hereby incorporated by reference in its entirety, and claims priority to EP 18190413.7 filed Aug. 23, 2018.

TECHNICAL FIELD

The present application relates to a photodetector apparatus. Some example embodiments are suited for physiological measurement sensors.

BACKGROUND

This section illustrates background information without admission of any technique described herein representative of the state of the art.

Various measurement devices that measure physiological parameters of a subject such as pulse sensors can be used for measuring heart rate, respiration, movements or other personal parameters. The measurements can be performed for example by using a sensor apparatus that is worn around a body part, one example being a wrist worn watch-like sensor apparatus.

A photoplethysmographic (PPG) sensor is an optical sensor suited for physiological measurements. A PPG apparatus illuminates the target and measures the amount of light either transmitted through or reflected from the target. Challenges in PPG apparatus design include for example a need to reduce motion artifacts and a need to improve sensor sensitivity.

In addition to PPG apparatuses, similar challenges may exist also in other optical sensors used for physiological measurements.

SUMMARY

Various aspects of example embodiments are set out in the claims.

According to a first example aspect, there is provided an apparatus comprising: a light source configured to illuminate a target, wherein the apparatus is configured to receive incident light reflected from or transmitted through the target, the apparatus comprising
  a reflective element configured to direct at least part of the received incident light to a focus point, and
  a photodetector configured to receive light from the focus point.

In an example embodiment, at least a portion of the reflective element is in a spaced relationship from the focus point and the light source.

In an example embodiment, the reflective element is configured to direct to the focus point incident light that has a predefined angle of incidence. The predefined angle of incidence may be for example 30 degrees or 25-35 degrees.

In an example embodiment, the focus point and the light source are in a stacked configuration with respect to each other.

In an example embodiment, the photodetector is located at the focus point such that the photodetector receives the light directed to the focus point.

In an example embodiment, the apparatus comprises a collimating element configured to collimate the light directed to the focus point prior to the photodetector receiving the light. In an example embodiment, the collimating element receives light from the focus point, collimates the light and the photodetector receives collimated light from the collimating element.

In an example embodiment, the collimating element is a parabolic reflector.

In an example embodiment, the reflective element has an annular or a semiannular shape. In an example embodiment, the reflective element has an annular or a semiannular shape surrounding the light source.

In an example embodiment, the reflective element has a concave inner surface.

In an example embodiment, the reflective element has a reflective inner surface.

In an example embodiment, the photodetector comprises a dual detector configuration.

In an example embodiment, the apparatus comprises a signal processing element configured to produce a physiological measurement result based on an output signal provided by the photodetector.

In an example embodiment, the apparatus is a physiological measurement sensor.

In an example embodiment, the apparatus is a photoplethysmographic sensor.

According to a second example aspect, there is provided a user wearable apparatus comprising any apparatus defined in the foregoing.

Different non-binding example aspects and embodiments have been illustrated in the foregoing. The embodiments in the foregoing are used merely to explain selected aspects or steps that may be utilized in implementations according to the present disclosure. Some embodiments may be presented only with reference to certain example aspects. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

Example embodiments of the present disclosure and its potential advantages are understood by referring to FIGS. 1 through 6 of the drawings. In this document, like reference signs denote like parts or steps.

In various example embodiments there is provided an optical sensor arrangement suited for being used in apparatuses that measure physiological parameters of a subject.

Such apparatuses measure physiological parameters of the subject and produce sensor signals corresponding to a property of the matter underlying the skin of the subject (capillaries and veins, for example). The optical sensor arrangement is suited e.g. for user wearable sensor devices.

In the following, various example embodiments are discussed in connection with photoplethysmographic (PPG) apparatuses for measuring physiological parameters of a subject. Various example embodiments are however not necessarily limited to PPG apparatuses only. Alternatively or additionally the example embodiments can use other types of optical sensor apparatuses for measuring physiological parameters of a subject. Physiological parameters or physiological measurement results referred to herein may include for example one or more of the following: heart rate, respiration rate, blood pressure, blood oxygen saturation level, and blood glucose level.

Figure 1:
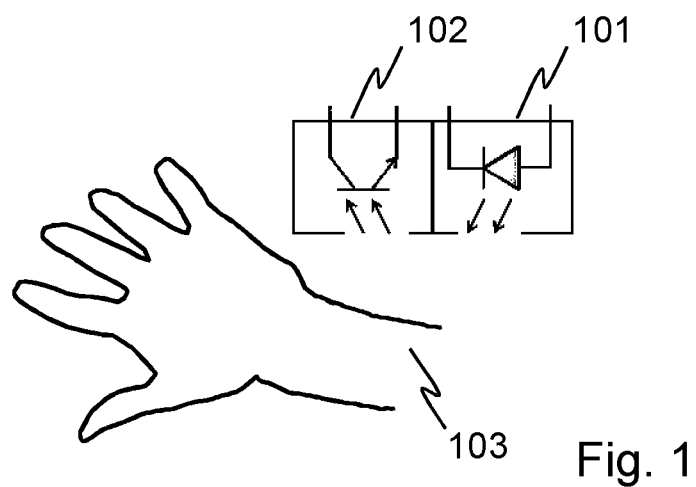
FIG. 1 is a simplified illustration of an example PPG measurement.

FIG. 1 is a simplified illustration of an example PPG apparatus. The shown apparatus is a reflective type PPG apparatus that comprises a light source 101 and a photodetector 102. The light source in the shown example is a LED (light emitting diode) and the photodetector is a phototransistor. Also a photo diode (PD) may be used as the photodetector. The light source 101 emits light and the photodetector 102 receives light rays reflected from tissue 103 of a subject. The PPG apparatus produces sensor signals based on the light detected by the photodetector 102. Another type of PPG apparatus is a transmissive PPG apparatus wherein the photodetector detects light transmitted through tissue of the subject.

Figure 2:
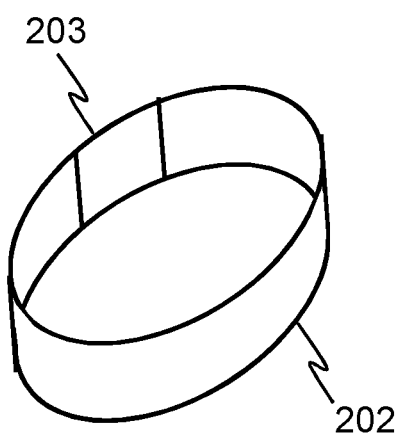
FIG. 2 is a simplified illustration of an example user wearable sensor device.

FIG. 2 is a simplified illustration of an example apparatus 203 wherein example embodiments may be implemented. The apparatus 203 is attached to a strap 202 that allows the apparatus 203 to be fitted for example around a wrist of a subject.

The casing of the apparatus 203 can be made of a suitable material, such as a plastics material (e.g. acrylonitrile butadiene styrene (ABS) or polycarbonate (PC)), carbon fiber materials, glass, wood, metal, ceramics, fabric, leather or any combination of these. The strap 202 may be made of suitable flexible material, such as plastic, fabric, and leather. In an example embodiment, the strap 202 and the casing of the apparatus 203 are integrally formed of one piece of material. The material can comprise or consist for example of any of the following: plastics, metals, nano-fibers, carbon fiber, leather, fabric and glass.

FIG. 2. shows the apparatus 203 attached to a strap 202, but the sensor may equally be part of some other user wearable apparatus that can be fitted around or attached to a body part (e.g. wrist, ankle or finger) of a user. The apparatus 203 may be configured to be integrated into a garment of a subject. The apparatus may be attached or integrated for example to a belt, a sock, a shoe, a sleeve or a collar of a shirt or pullover, and/or a waistband of trousers or skirt. The apparatus may be detachable from the garment. The apparatus may be shaped like a watch and it may be configured to display time or other useful information to the user. The apparatus may be attached to a patch or to a plaster (with adhesive) or to a ring. A further alternative is that the apparatus is attached to an ear of the user. The apparatus may be part of an earplug, for example.

Figure 3:
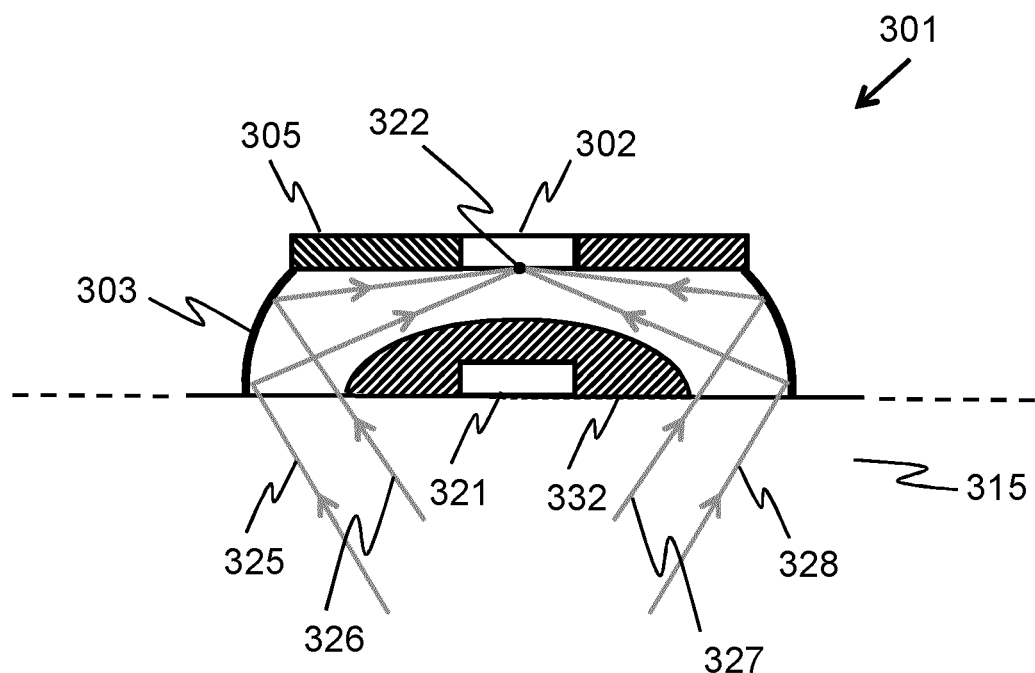
FIG. 3 is a cross sectional view of a sensor device of an example embodiment.

FIG. 3 shows a cross sectional view of an optical sensor arrangement 301 of an example embodiment. FIG. 3 shows tissue 315 of a subject and the optical sensor arrangement 301 comprising a photodetector 302 and a light source 321. Further there is opaque material 332 that surrounds the light source 321, a reflective element 303 and a support structure 305. The opaque material 332 reduces internal light pollution in the optical sensor arrangement. In the shown example embodiment, the reflective element 303 and the support structure 305 form walls of an inner space around the light source 321 and the opaque material 332. There may be one annular element forming the reflective element 303 or the reflective element 303 may be formed of a plurality of separate elements. Further it is to be noted that that support structure 305 is not mandatory. Alternatively, for example the reflective element 303 may provide the effect of the support structure 305.

The reflective element 303 is configured to direct incident light to a focus point 322. For achieving this effect the reflective element 303 may have a reflective inner surface and/or a concave structure. It is to be noted that it suffices that the inner surface is at least partially reflective, i.e. there may be parts of the inner surface that are not reflective. The reflective element may comprise a mirror or a plastic structure coated with reflective material such as a metal. In an embodiment the reflective element has a concave inner surface or at least partially concave inner surface. Additionally, the reflective element may have some other form that provides the effect of directing incident light to the focus point.

The focus point is located inside the inner space of the optical sensor arrangement. In the example embodiment of FIG. 3 the photodetector 302 is arranged at the focus point 322. A technical effect of focusing incident light to the focus point and therefrom to the photodetector is that the amount of light detected by the photodetector may be increased.

The reflective element 303 is shaped and/or positioned in a spaced relationship from the focus point 322 and the photodetector 302 to reflect the electromagnetic radiation that leaves the tissue 315 or arrives at the reflective element 303 at a given angle or at a range of angles to the focus point and thereby onto the photodetector 302. In the shown example, the reflective element 303 is in a spaced relationship also from the light source 321. Spaced relationship refers to a configuration where there is space for incident light to reflect from the reflective element 303 and to travel to the focus point 322. Thus, the reflective element 303 may be part of a structure that extends from one end to the focus point 322, while the reflective element and the focus point remain in a spaced relationship in consideration of incident light with desired angle of incidence. In other words, it suffices that at least a portion of the reflective element is in a spaced relationship from the focus point 322. In the example embodiment of FIG. 3 the reflective element has an axis of symmetry and the light source 321, focus point 322 and the photodetector 302 are located along the axis of symmetry. It may be defined that the focus point 322 and the light source 321 are in a spaced relationship from each other and/or in a stacked configuration with respect to each other. The reflective element 303 may be formed in the space between the light source and the focus point. In the example of FIG. 3 the light source 321 is located in vicinity of a surface of the sensor arrangement facing the tissue 315. The focus point 322 is located behind the light source 321 along the axis of symmetry. These are nevertheless only example geometries and as such not mandatory.

In an embodiment the curvature and/or positioning of the reflective element 303 is chosen so that light rays with a predefined angle of incidence are directed to the focus point 322. The predefined angle of incidence may be for example 30 degrees or 25-35 degrees.

In an example embodiment, the optical sensor arrangement 301 of FIG. 3 operates as follows: The light source 321 emits light and illuminates the tissue 315. Light rays 325-328 are reflected from the tissue 315 back to the optical sensor arrangement 301. In alternative embodiments, the light rays may be transmitted through the tissue. The reflective element 303 directs the light rays 325-328 to the focus point 322. The photodetector 302 receives and detects the light rays 325-328 at the focus point. The reflective element collects light from multiple directions to increase the amount of light detected by the photodetector. This may improve sensitivity of the optical sensor arrangement. In an example embodiment the reflective element collects light 360 degrees around the light source 321.

Sensor signals produced by the light detected by the photodetector 302 may then be used for providing physiological measurement results. There may be for example a signal processing element (not shown in FIG. 3) configured to produce the physiological measurement results. The signal processing element may comprise a processor such as a microprocessor or a digital signal processor. Additionally the signal processing element may comprise one or more analog components such as amplifiers, impedances, current-to-voltage converters, voltage-to-current converters, digital-to-analog converters and/or analog-to-digital converters.

Figure 4:
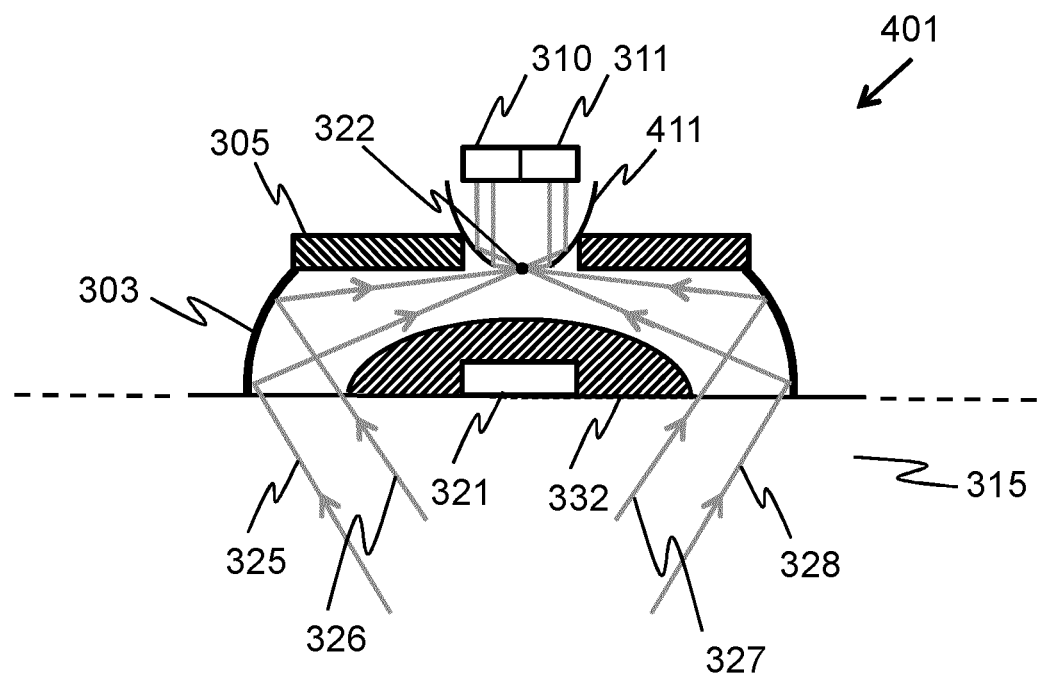
FIG. 4 is a cross sectional view of a sensor device of another example embodiment.

FIG. 4 is a cross sectional view of an optical sensor arrangement of another example embodiment. The shown example embodiment comprises an additional structure that directs light from the focus point to the photodetector. This embodiment is suitable for arrangements comprising a dual detector configuration, i.e. arrangements where the photodetector comprises first and second photodetectors that are configured to concurrently detect incident light. The first and second photodetectors may reside side by side or in a stacked configuration. The first and second photodetectors may have interlocking shapes. The first and second photodetectors may be formed of a plurality of photodetectors in an array configuration. Use of dual detector configuration is nevertheless not mandatory. FIG. 4 shows tissue 315 of a subject and the optical sensor arrangement 401 comprising a dual detector configuration comprising a first photodetector 310 and a second photodetector 311. Further there is a light source 321, opaque material 332 that surrounds the light source 321, a reflective element 303 and a support structure 305. Still further there is an additional structure configured to direct light from the focus point to the photodetector. In the shown example the additional structure is a collimating element 411. The opaque material 332 reduces internal light pollution in the optical sensor arrangement. The reflective element 303 and the support structure 305 form walls of an inner space around the light source 321 and the opaque material 332. There may be one annular element forming the reflective element 303 or the reflective element 303 may be formed of a plurality of separate elements. Further it is to be noted that that support structure 305 is not mandatory. Alternatively, for example the reflective element may provide the effect of the support structure 305.

The reflective element 303 is configured to direct incident light to a focus point 322. For achieving this effect the reflective element 303 have reflective inner surfaces and/or a concave structure configured to direct incident light to a focus point 322. It is to be noted that it suffices that the inner surface is at least partially reflective, i.e. there may be parts of the inner surface that are not reflective. The reflective element may comprise a mirror or a plastic structure coated with reflective material such as a metal. In an embodiment the reflective element has a concave inner surface or at least partially concave inner surface. Additionally, the reflective element may have some other form that provides the effect of directing incident light to the focus point.

In the example embodiment of FIG. 4 the collimating element 411 is arranged to receive light from the focus point 322 and to direct collimated light to the photodetector 302. The collimating element may be for example a parabolic reflector or a suitable lens arrangement such as a Fresnel lens.

The reflective element 303 is shaped and/or positioned in a spaced relationship from the focus point 322 and the photodetector 302 to reflect the electromagnetic radiation that leaves the tissue 315 or arrives at the reflective element 303 at a given angle or at a range of angles to the focus point and thereby to the collimating element 411 and onto the photodetector 302. In the shown example, the reflective element 303 is in a spaced relationship also from the light source 321. Spaced relationship refers to a configuration where there is space for incident light to reflect from the reflective element 303 and to travel to the focus point 322. Thus, the reflective element 303 may be part of a structure that extends from one end to the focus point 322, while the reflective element and the focus point remain in a spaced relationship in consideration of incident light with desired angle of incidence. In other words, it suffices that at least a portion of the reflective element is in a spaced relationship from the focus point 322. In the example embodiment of FIG. 4 the reflective element has an axis of symmetry and the light source 321, the focus point 322, the collimating element 411 and the photodetector 302 are located along the axis of symmetry. It may be defined that the focus point 322 and the light source 321 are in a spaced relationship from each other and/or in a stacked configuration with respect to each other. The reflective element 303 may be formed in the space between the light source and the focus point. In the example of FIG. 3 the light source 321 is located in vicinity of a surface of the sensor arrangement facing the tissue 315. The focus point 322 is located behind the light source 321 along the axis of symmetry. These are nevertheless only example geometries and as such not mandatory.

In an embodiment the curvature and/or positioning of the reflective element 303 is chosen so that light rays with a predefined angle of incidence are directed to the focus point 322. The predefined angle of incidence may be for example 30 degrees or 25-35 degrees.

In an example embodiment, the optical sensor arrangement 401 of FIG. 4. operates as follows: The light source 321 emits light and illuminates the tissue 315. Light rays 325-328 are reflected from the tissue 315 back to the optical sensor arrangement 401. The reflective element 303 directs the light rays 325-328 to the focus point. The collimating element 411 receives light rays from the focus point and collimates the light rays. The photodetectors 310 and 311 receive and detect the collimated light rays from the focus point 322. The reflective element collects light from multiple directions to increase the amount of light detected by the photodetectors 310, 311. This may improve sensitivity of the optical sensor arrangement. In an example embodiment the reflective element collects light 360 degrees around the light source 321.

Sensor signals produced by the light detected by the photodetectors 310 and 311 may then be used for providing physiological measurement results. There may be for example a signal processing element (not shown in FIG. 3) configured to produce the physiological measurement results. The signal processing element may comprise a processor such as a microprocessor or a digital signal processor. Additionally the signal processing element may comprise one or more analog components such as amplifiers, impedances, current-to-voltage converters, voltage-to-current converters, digital-to-analog converters and/or analog-to-digital converters.

The dual detector configuration shown in FIG. 4 operates as follows: the first photodetector is configured to receive a range of wavelengths and the second photodetector is configured not to receive a target wavelength. The target wavelength may be indicated in terms of a single wavelength, for example 525 nm or 650 nm, but it is understood that the target wavelength may be a narrow wavelength band around the stated wavelength. There may be for example an optical blocking filter that is configured to filter the light incident at the second photodetector to block the target wavelength. Now, when the first and second photodetectors detect light, the second photodetector (which does not receive the target wavelength) can be considered to detect only unwanted wavelengths. The detected light signals may be subtracted from each other to produce a result signal that is cleared from noise and artifacts originating from the unwanted wavelengths. The resulting signal may then be used for producing a physiological measurement result, such as heart rate. Additionally, the signals detected by the first and second photodetectors may be used as such, i.e. without being subtracted from each other, for producing physiological measurement results.

It is to be noted that the dual photodetector arrangement shown in FIG. 4 is not mandatory. Instead the example embodiment of FIG. 4 may be used also with a single photodetector.

Figure 5:
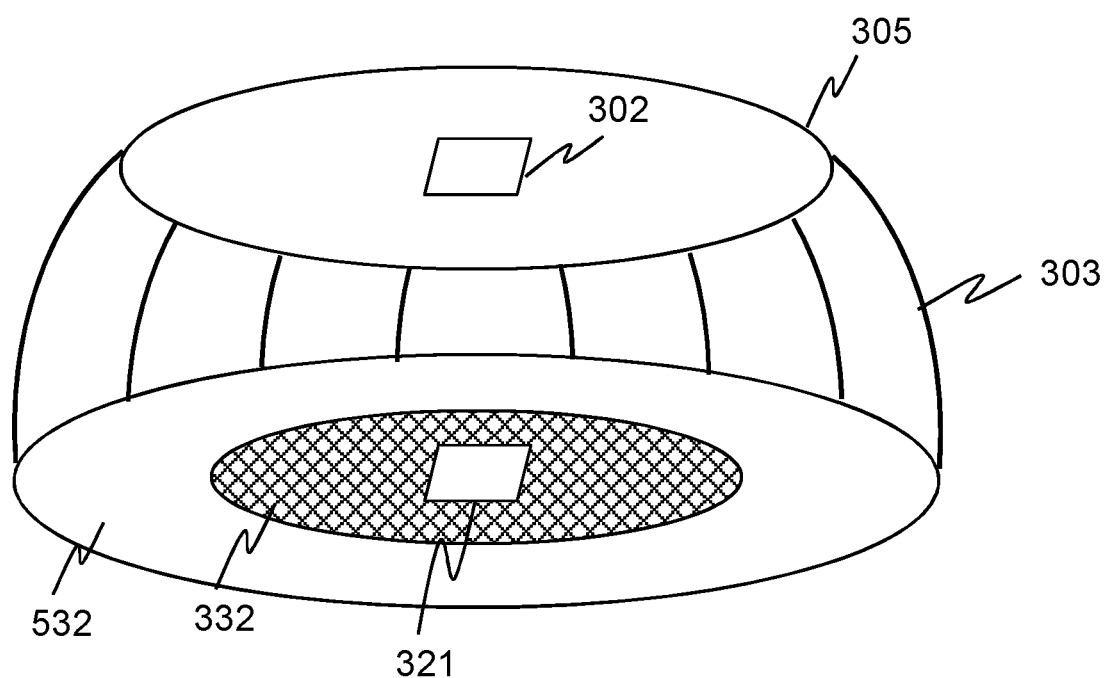
FIG. 5 shows a 3D sketch of a sensor device of an example embodiment.

FIG. 5 shows a 3D sketch of an optical sensor arrangement of an example embodiment. FIG. 5 shows a light source 321 and a photodetector 302 positioned along an axis of symmetry. Further the optical sensor arrangement comprises opaque material 332 that surrounds the light source 321, an area 532 configured for receiving incident light, a reflective element 303 and a support structure 305. The reflective element 303 has an annular form surrounding the area 532. There may be one annular element forming the reflective element 303 or the reflective element 303 may be formed of a plurality of separate elements. Further it is to be noted that that the support structure 305 may be part of the reflective element.

The reflective element 303 is configured to focus incident light received through the area 532 to be received by the photodetector 302. Example form and positioning the reflective element and other components of the optical sensor arrangement are discussed in more detail in connection with FIGS. 3 and 4.

Figure 6:
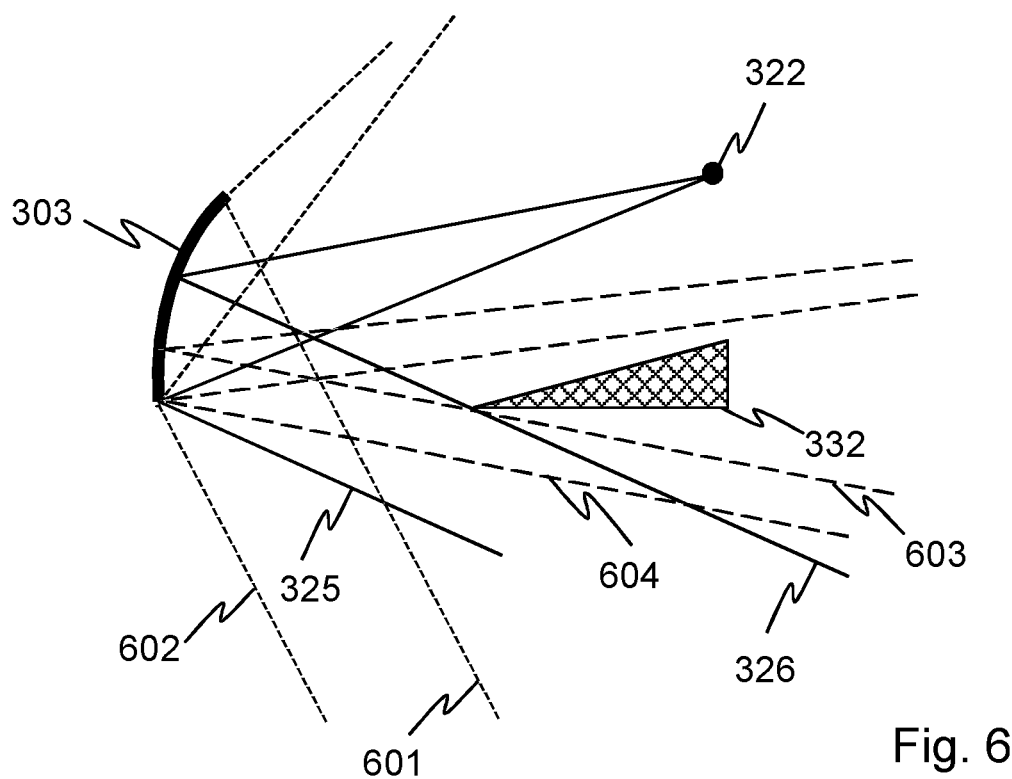
FIG. 6 illustrates trajectories of light rays with different incident angles in an example embodiment.

FIG. 6 illustrates trajectories of light rays with different incident angles in an example embodiment. FIG. 6 shows a partial sectional view of an optical sensor arrangement according to an example embodiment. There are shown opaque material 332, a reflective element 303, a focus point 322, and light rays 325-326 and 601-604. The light rays 601-602 have a first angle of incidence, the light rays 325-326 have a second angle of incidence, and the light rays 603-604 have a third angle of incidence. The reflective element 303 is configured to have a curvature that directs light rays 325-326 with the second angle of incidence to the focus point 322. The light rays 601-604 with first or third angle of incidence are not directed to the focus point 322. In this way the optical sensor arrangement detects light rays with desired angle of incidence.

As disclosed in the foregoing, the reflective element may be configured to collect incident light that has a predefined angle of incidence. In a reflective type PPG apparatus a light flux envelope between a light source and a detector forms a "banana" shape and due to this effect reflected light rays have an angle of incidence of approximately 30 degrees from tissue surface level. For example FIG. 7 of Alzahrani et al "A Multi Channel Opto-Electronic Sensor to Accurately Monitor Heart Rate against Motion Artefact during Exercise", Article in Sensors, November 2015, ISSN 1424-8220, www.mdpi.com/journal/sensors, explains this "banana effect" in more detail. In an embodiment the reflective element is configured to have a shape that collects light rays with approximately this angle of incidence. In alternative embodiments the reflective element is configured to have shape that collects light rays with another angle of incidence. For example in transmissive type PPG apparatus the angle of incidence of desired signals may be closer to perpendicular direction in relation to tissue surface level.

Without in any way limiting the scope, interpretation, or application of the claims appearing below, a technical effect of one or more of the example embodiments disclosed herein is that an improved optical sensor arrangement is provided. The sensor arrangement of example embodiments may increase the amount of light that is collected compared to at least some other optical sensor arrangements.

Another technical effect of one or more of the example embodiments disclosed herein is that the structure provides angle selection of the light that is detected by the photodetector.

Another technical effect of one or more of the example embodiments disclosed herein is that collimated light may be provided for example for dual detector arrangements.

Another technical effect of one or more of the example embodiments disclosed herein is that the solution is less sensitive to ambient and other unwanted light sources compared to at least some other optical sensor arrangements. Another technical effect of one or more of the example embodiments disclosed herein is that a wide spectrum light source can be used. For example wider spectrum than spectrum provided by LEDs could be used.

If desired, the different functions discussed herein may be performed in a different order and/or concurrently with each other. It is understood that desired features from one explicitly disclosed example embodiment may be combined with a selection of features from other example embodiments.

Although various aspects of present disclosure are set out in the independent claims, other aspects of the present disclosure comprise other combinations of features from the described example embodiments and/or the dependent claims with the features of the independent claims, and not solely the combinations explicitly set out in the claims.

It is also noted herein that while the foregoing describes example embodiments, these descriptions should not be viewed in a limiting sense. The example embodiments are not limited to the examples explicitly described in this specification but may vary within the scope of the appended claims.

The invention claimed is:

1. An apparatus, comprising:
a light source embedded into an outer surface of the apparatus and configured to illuminate a target, wherein the apparatus is configured to receive incident light reflected from the target, wherein an outer surface of the light source is exposed on the outer surface of the apparatus and is level with the outer surface of the apparatus, and edge surfaces of the light source extend to a depth into the apparatus from the outer surface of the apparatus, a reflector forming a wall around a space between an inner surface of the reflector and the light source and configured to direct at least part of the received incident light through a focus point, and a photodetector configured to receive the reflected incident light through the focus point;

wherein the focus point and the light source are in a stacked configuration with respect to each other with the focus point behind the light source, and wherein light is emitted from the light source to the target, reflected back from the target past the light source, and received at the focus point.

2. The apparatus of claim 1, wherein at least a portion of the reflector is in a spaced relationship from the focus point and the light source.

3. The apparatus of claim 1, wherein the reflector is configured to direct to the focus point incident light that has a predefined angle of incidence.

4. The apparatus of claim 1, wherein the photodetector is located at the focus point such that the photodetector receives the light directed to the focus point.

5. The apparatus of claim 1, further comprising a collimator configured to collimate the light directed to the focus point prior to the photodetector receiving the light.

6. The apparatus of claim 5, wherein the collimator is a parabolic reflector.

7. The apparatus of claim 1, wherein the reflector has an annular or a semiannular shape.

8. The apparatus of claim 1, wherein the reflector has an annular or a semiannular shape surrounding the light source.

9. The apparatus of claim 1, wherein the reflector has a concave inner surface.

10. The apparatus of claim 1, wherein the reflector has a reflective inner surface.

11. The apparatus of claim 1, wherein the photodetector comprises a dual detector configuration comprising a first photodetector configured to receive a range of wavelengths and a second photodetector, wherein the second photodetector comprises an optical filter configured to not receive a target wavelength.

12. The apparatus of claim 1, further comprising a signal processor configured to produce a physiological measurement result based on an output signal provided by the photodetector.

13. The apparatus of claim 1, wherein the apparatus is a physiological measurement sensor.

14. The apparatus of claim 1, wherein the apparatus is a photoplethysmographic sensor.

15. An apparatus, comprising:

a light source embedded into a skin-facing surface and configured to illuminate a target, wherein the apparatus is configured to receive incident light reflected from the target, wherein an outer surface of the light source is exposed on an outer surface of the apparatus and is level with the outer surface of the apparatus, and edge surfaces of the light source extend to a depth into the apparatus from the outer surface of the apparatus, a reflector forming a wall around a space between an inner surface of the reflector and the embedded light source and configured to direct at least part of the received incident light across the space from the inner surface of the wall and through a focus point, a collimator configured to collimate the light reflected from the reflector and directed to the focus point prior to the photodetector receiving the light, and a photodetector configured to receive light from the focus point;

wherein the focus point and the light source are in a stacked configuration with respect to each other with the focus point behind the light source, and wherein light is emitted from the light source to the target, reflected back from the target past the light source, and received at the focus point.

16. An apparatus, comprising:

a light source configured to illuminate a target, wherein the apparatus is configured to receive incident light reflected from the target, wherein an outer surface of the light source is exposed on an outer surface of the apparatus and is level with the outer surface of the apparatus, an opaque material surrounding and positioned directly against at least a portion of the light source, wherein the light source is embedded into an exposed surface of the opaque material and edge surfaces of the light source extend to a depth into the opaque material from the outer surface of the apparatus, a reflector forming a wall around a space between an inner surface of the reflector and the light source and configured to direct at least part of the received incident light across the space formed from the reflector and through a focus point, and a photodetector configured to receive light from the focus point;

wherein the focus point and the light source are in a stacked configuration with respect to each other with the focus point behind the light source, and wherein light is emitted from the light source to the target, reflected back from the target past the light source, and received at the focus point.

* * * * *